US009897428B2

(12) United States Patent
Hieb

(10) Patent No.: US 9,897,428 B2
(45) Date of Patent: Feb. 20, 2018

(54) DIAMETRAL MEASUREMENT SYSTEM FOR EVALUATION OF CYLINDRICAL OBJECTS, INCLUDING ROCK CORES

(71) Applicant: Monte Hieb, Summersville, WV (US)

(72) Inventor: Monte Hieb, Summersville, WV (US)

( * ) Notice: Subject to any disclaimer, the term of this patent is extended or adjusted under 35 U.S.C. 154(b) by 164 days.

(21) Appl. No.: 14/977,401

(22) Filed: Dec. 21, 2015

(65) Prior Publication Data

US 2016/0178341 A1 Jun. 23, 2016

Related U.S. Application Data

(60) Provisional application No. 62/095,527, filed on Dec. 22, 2014.

(51) Int. Cl.
*G01B 5/10* (2006.01)
*G01B 5/30* (2006.01)
*G01L 1/00* (2006.01)

(52) U.S. Cl.
CPC ............... *G01B 5/10* (2013.01); *G01B 5/30* (2013.01); *G01L 1/00* (2013.01); *G01B 2210/44* (2013.01)

(58) Field of Classification Search
CPC ....................................................... G01B 5/10
USPC ............................................. 33/55.1, 555.1
See application file for complete search history.

(56) References Cited

U.S. PATENT DOCUMENTS

| | | | |
|---|---|---|---|
| 2,318,102 A | 5/1943 | Ruge | |
| 2,563,254 A | 8/1951 | Lewis | |
| 2,599,578 A | 6/1952 | Obert et al. | |
| 2,688,802 A | 9/1954 | Jones | |
| 3,169,323 A | 2/1965 | Hold | |
| 3,278,881 A | 10/1966 | Anderson et al. | |
| 3,305,932 A * | 2/1967 | Iselin | B07C 5/02 33/501.02 |
| 3,362,284 A | 1/1968 | Patrignani | |
| 3,371,419 A | 3/1968 | Banks et al. | |
| 3,648,377 A * | 3/1972 | Witzke | G01B 7/282 33/550 |
| 3,749,501 A | 7/1973 | Wieg | |
| 3,757,423 A | 9/1973 | Wieg | |
| 3,913,234 A | 10/1975 | Windle | |

(Continued)

FOREIGN PATENT DOCUMENTS

| | | | | |
|---|---|---|---|---|
| CA | 2 805 518 A1 | 2/2012 | | |
| GB | 2020030 A * | 11/1979 | ............ | G01B 5/0004 |

OTHER PUBLICATIONS

Funato, Akio, et al., "Laboratory Verification of the Diametrical Core Deformation Analysis (DCDA) Developed for In-situ Stress Measurements," ARMA 12-588, American Rock Mechanics Association, Copyright 2012, 6 pgs.

*Primary Examiner* — Christopher Fulton
(74) *Attorney, Agent, or Firm* — Stoel Rives LLP

(57) ABSTRACT

Diametral measurement systems can be used to measure and evaluate the diametral variation of cylindrical objects, such as cylindrical rock cores. A diametral measurement system can include two indicator gauges aligned opposite one another for measuring diametral variation as the cylindrical object is rotated. Measurements from the diametral measurement system may be obtained at predetermined intervals through one or more rotations of the cylindrical object. The measurements obtained from diametral measurement systems can be used to evaluate the magnitude and orientation of in-situ stress and strain normal to the rock core axis.

21 Claims, 8 Drawing Sheets

(56) References Cited

U.S. PATENT DOCUMENTS

| | | | |
|---|---|---|---|
| 3,922,094 A | 11/1975 | Colding et al. | |
| 4,064,633 A | 12/1977 | Wertepny | |
| 4,215,482 A * | 8/1980 | Szewczyk | G01B 5/25 33/412 |
| 4,240,206 A | 12/1980 | Baresh et al. | |
| 4,344,233 A | 8/1982 | Albertazzi | |
| 4,587,739 A | 5/1986 | Holcomb et al. | |
| 4,596,076 A * | 6/1986 | Sigg | G01B 5/08 33/501 |
| 4,700,484 A | 10/1987 | Frank et al. | |
| 4,811,524 A * | 3/1989 | Corallo | B23Q 17/20 33/783 |
| 4,875,375 A * | 10/1989 | Wu | G01B 7/24 73/795 |
| 4,903,413 A * | 2/1990 | Bellwood | G01B 7/282 33/551 |
| 4,905,521 A | 3/1990 | Wagner et al. | |
| 4,907,345 A | 3/1990 | Dall'Aglio et al. | |
| 4,977,682 A * | 12/1990 | Allen, III | G01B 5/201 33/501.1 |
| 5,022,267 A | 6/1991 | Shattuck et al. | |
| 5,086,569 A * | 2/1992 | Possati | G01B 7/12 33/549 |
| 5,088,207 A * | 2/1992 | Betsill | G01B 5/10 33/1 BB |
| 5,116,234 A * | 5/1992 | Bertz | G01B 5/004 33/550 |
| 5,117,081 A * | 5/1992 | Bagdal | G01B 11/2408 219/69.11 |
| 5,123,283 A | 6/1992 | Duff et al. | |
| 5,197,200 A | 3/1993 | Bahr et al. | |
| 5,351,410 A * | 10/1994 | Hainneville | G01B 5/08 33/542 |
| 5,419,056 A * | 5/1995 | Breitenstein | G01B 5/252 33/549 |
| 5,542,188 A * | 8/1996 | Ertl | G01B 21/12 33/549 |
| 5,643,049 A | 7/1997 | Liskow | |
| 5,868,030 A | 2/1999 | Brumley et al. | |
| 6,159,074 A * | 12/2000 | Kube | B24B 5/00 33/549 |
| 6,175,813 B1 | 1/2001 | Purchase et al. | |
| 6,286,223 B1 * | 9/2001 | Iwamoto | G01B 5/08 33/555.1 |
| 6,511,364 B2 | 1/2003 | Ido et al. | |
| 6,754,973 B2 * | 6/2004 | Takahashi | G01B 5/201 33/551 |
| 7,607,239 B2 | 10/2009 | Dall'Aglio et al. | |
| 7,748,134 B1 * | 7/2010 | Wang | G01B 5/201 33/551 |
| 7,954,253 B2 | 6/2011 | Dall'Aglio et al. | |
| 8,601,917 B2 | 12/2013 | Schreiber | |
| 9,170,089 B2 * | 10/2015 | Logan | G01B 11/00 |
| 9,404,725 B2 * | 8/2016 | Ashkenazi | D07B 7/022 |
| 2003/0079359 A1 | 5/2003 | Richards | |

* cited by examiner

FIG. 6B

| | | | | | | | | |
|---|---|---|---|---|---|---|---|---|
| 177 | 3/20/2015 | 20:14:34 | 1:+0.03400 | 2:+0.00985 | +0.03400 | +0.00985 | 347.91 | 1.98010 |
| 178 | 3/20/2015 | 20:14:35 | 1:+0.03640 | 2:+0.00740 | +0.03640 | +0.00740 | 352.23 | 1.98005 |
| 179 | 3/20/2015 | 20:14:36 | 1:+0.03805 | 2:+0.00595 | +0.03805 | +0.00595 | 356.55 | 1.98025 | R = 1.990
| 180 | 3/20/2015 | 20:14:37 | 1:+0.03890 | 2:+0.00530 | +0.03890 | +0.00530 | 0.86 | 1.98045 |
| 181 | 3/20/2015 | 20:14:38 | 1:+0.04065 | 2:+0.00415 | +0.04065 | +0.00415 | 5.18 | 1.98105 |
| 261 | 3/20/2015 | 20:15:58 | 1:+0.03780 | 2:+0.00640 | +0.03780 | +0.00640 | 350.50 | 1.98045 |
| 262 | 3/20/2015 | 20:15:59 | 1:+0.03815 | 2:+0.00595 | +0.03815 | +0.00595 | 354.82 | 1.98035 |
| 263 | 3/20/2015 | 20:16:00 | 1:+0.03925 | 2:+0.00490 | +0.03925 | +0.00490 | 359.14 | 1.98040 | R = 2.998
| 264 | 3/20/2015 | 20:16:01 | 1:+0.04070 | 2:+0.00350 | +0.04070 | +0.00350 | 3.45 | 1.98045 |
| 265 | 3/20/2015 | 20:16:02 | 1:+0.04250 | 2:+0.00230 | +0.04250 | +0.00230 | 7.77 | 1.98105 |
| 344 | 3/20/2015 | 20:17:21 | 1:+0.03850 | 2:+0.00570 | +0.03850 | +0.00570 | 348.78 | 1.98045 |
| 345 | 3/20/2015 | 20:17:22 | 1:+0.03935 | 2:+0.00480 | +0.03935 | +0.00480 | 353.09 | 1.98040 |
| 346 | 3/20/2015 | 20:17:23 | 1:+0.04075 | 2:+0.00350 | +0.04075 | +0.00350 | 357.41 | 1.98050 | R = 3.993
| 347 | 3/20/2015 | 20:17:24 | 1:+0.04240 | 2:+0.00170 | +0.04240 | +0.00170 | 1.73 | 1.98035 |
| 348 | 3/20/2015 | 20:17:25 | 1:+0.04460 | 2:-0.00030 | +0.04460 | -0.00030 | 6.04 | 1.98055 |
| 428 | 3/20/2015 | 20:18:45 | 1:+0.04045 | 2:+0.00280 | +0.04045 | +0.00280 | 351.37 | 1.97950 |
| 429 | 3/20/2015 | 20:18:46 | 1:+0.04260 | 2:+0.00110 | +0.04260 | +0.00110 | 355.68 | 1.97995 | R = 4.988
| 430 | 3/20/2015 | 20:18:47 | 1:+0.04480 | 2:-0.00090 | +0.04480 | -0.00090 | 0.00 | 1.98015 | R = 5.000
| 431 | | | | | | | 0.00 | |
| 432 | | | | | | | 0.00 | |

430 - 13 = 417 DATA POINTS (this example)

FIG. 6B (Cont'd)

DIAMETRAL MEASUREMENT SYSTEM FOR EVALUATION OF CYLINDRICAL OBJECTS, INCLUDING ROCK CORES

RELATED CASES

This application claims priority to U.S. Provisional Application No. 62/095,527, filed on Dec. 22, 2014 and titled "DIAMETRAL MEASUREMENT SYSTEM FOR EVALUATION OF CYLINDRICAL OBJECTS, INCLUDING ROCK CORES," which is hereby incorporated by reference in its entirety.

TECHNICAL FIELD

The present disclosure relates to measurement systems and, more specifically, to measurement systems for measuring and/or evaluating the outside diametral variation of cylindrical objects.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 6B is a chart of the result of an analytical process developed to compute the angular position (0-360 degrees) of each measurement of a cylindrical object.

DETAILED DESCRIPTION

Figure 1:
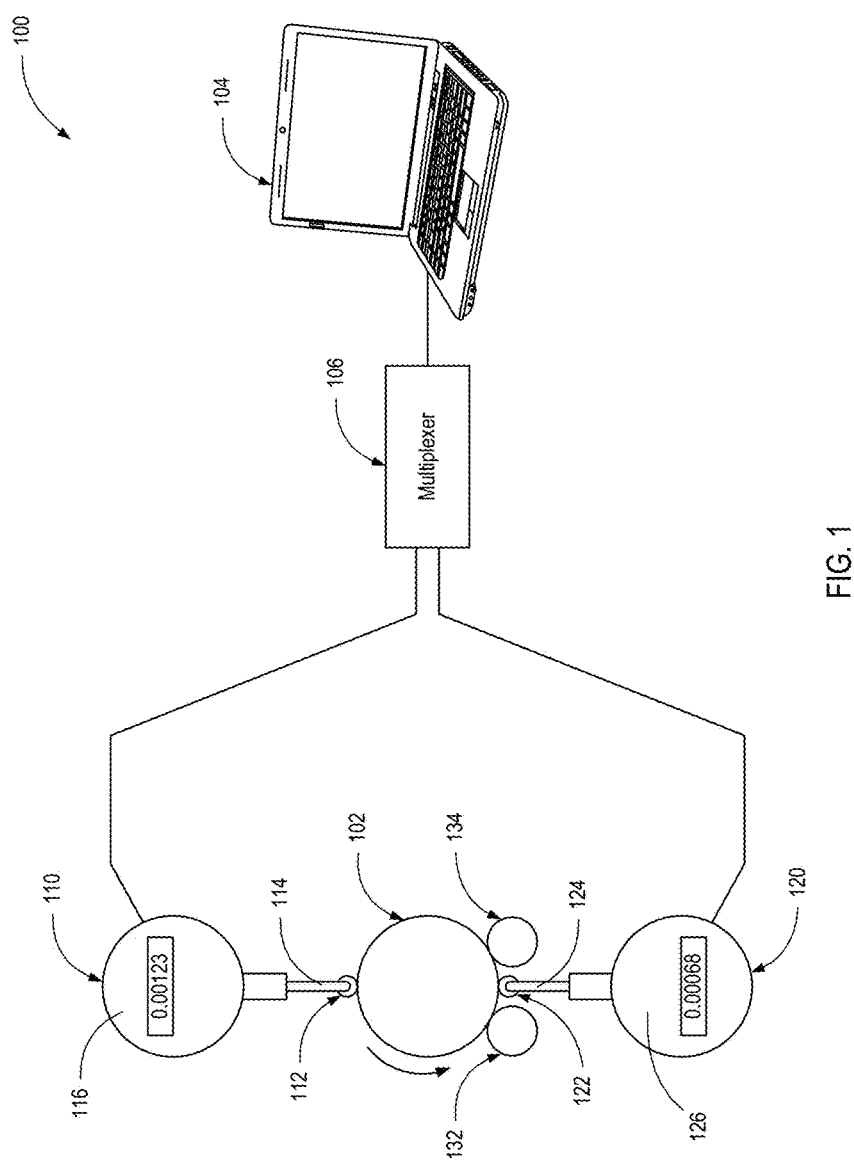
FIG. 1 is a schematic diagram illustrating a diametral measurement system configured to record the outside diameter of a cylindrical object.

A diametral measurement system may be used to determine the outside diametral profile of a cylindrical object. For example, some diametral measurement systems are designed to evaluate the diametral profile of rock core cylinders. Measurements obtained from such systems may be used to evaluate parameters of in-situ strain and/or stress. Stated differently, a diametral measurement system may be used to determine the strain and/or stress at a rock's natural or original place of origin.

For example, during exploratory drilling, cylindrical rock cores may be extracted from depths of the earth ranging typically from a few tens of feet deep to several thousand feet deep. To extract the cylindrical rock cores, a special drill bit which spins to cut rock may be attached at the bottom of a continuous string of sequentially-attached drill rods. As the drill rods are advanced within the earth, the drill bit cuts a cylinder of rock core. As the core is cut, the core slides into a "core barrel" which protects the freshly cut cores until they are brought to the surface. As the rock core cylinder is cut from its in-situ confinement at the bottom of a core hole, it has an essentially perfectly circular diametral profile as a result of being cut by spinning action of the drill. However, upon liberation from earth confinement, the cut core begins to deform as earth confinement stresses and fluid pressures acting on the core are removed and the rock core relaxes. Over the space of the next minutes, hours, and days, the net amount of diametral changes may amount to only a few thousandths of an inch, but detailed 360-degree diametral measurement of this elongation can allow for estimation of the direction and/or magnitude of strain or stress on the rock cylinder when the rock core cylinder was confined within the earth. Stated differently, a diametral measurement system may be used to ascertain diameter measurements of a rock core as a cylindrical rock core is rotated through one or more uninterrupted 360-degree rotations about the longitudinal axis of the rock core.

In some embodiments, a diametral measurement system may include a diametral measurement device in combination with one or more analytical applications (e.g., software). The diametral measurement system may facilitate analysis and/or evaluation of diametral deformation in a two-dimensional plane that is perpendicular to the longitudinal axis of the core. Stated differently, in some embodiments and/or circumstances, a diametral measurement system may be used to determine the principal diametral elongation direction and/or magnitude. In some embodiments, the diametral measurement system may be used to identify the direction of stress and/or strain. The direction of such stress and/or strain may be described in degrees of azimuth relative to true north.

For cores recovered from vertical holes, the measured deformations may be in the horizontal plane. These deformations can be readily converted to strain and, if the certain rock properties are known (e.g., the Young's modulus (elasticity modulus) and Poisson's ratio), then the strain values can be converted to stress estimates. Stated differently, horizontal in-situ stress estimation may be computed from rock core measurements obtained from a diametral measurement system. Estimates of in-situ stress can be used to help plan and safely operate mining, drilling, and underground construction projects around the world. Conventional methods for making in-situ stress measurements prior to mining an area can be difficult and expensive. The diametral measurement system and methods described herein can provide a cost-effective alternative to supplement and/or replace conventional methods.

In short, diametral measurement systems may provide a robust, quick, and economical method for quantifying the direction and magnitude of principal diametral deformation and strain, which are important parameters for estimating in-situ stress. Determining these parameters from core samples recovered from exploration holes drilled from the surface, without assistance from specialized down-hole equipment, remains a challenge for geological exploration, mining, hydrocarbon drilling, and other types of operations and geomechanical investigations.

As used herein, the terms "cylindrical object" and "cylinder" refer to any object of generally cylindrical proportions. Unless otherwise stated, all ranges include both endpoints and all numbers between the endpoints. While specific reference is made herein to systems for determining the diametral profile of cylindrical rock cores, the disclosed principles and features may be applied and used to analyze a variety of different cylindrical objects. Thus, although some embodiments are described with reference to cylindrical rock cores, it should be recognized that the disclosure is not limited to this specific context.

Descriptions and claims of exemplary embodiments are described in additional detail below. Description and claims for processes in which diametral measurements are obtained and/or angular position values are calculated are also presented below.

FIG. 1 is a schematic diagram illustrating a diametral measurement system 100 configured to record the outside diameter of a cylinder 102 (e.g., a rock core cylinder). The diametral measurement system 100 includes a first indicator gauge 110, a second indicator gauge 120, and a plurality of parallel drive rollers (cylinder rollers 132, 134). The cylinder rollers 132, 134 are configured to slowly rotate a cylinder 102 about its long axis at a controlled (e.g., constant) speed, while the two diametrically-opposed digital indicator gauges 110, 120 measure diametral variation of the cylinder 102.

As depicted in FIG. 1, each indicator gauge 110, 120 may include a housing 116, 126, a shaft 114, 124, and a small roller stylus wheel 112, 122 (e.g., a roller wheel) at the end of the shaft 114, 124. The shafts 114, 124 may be configured to extend and retract from the housing 116, 126 of the gauge indicator 110, 120 to ensure that the roller wheels 112, 122 remain in contact with the cylindrical object 102 as the cylindrical object 102 is rotated. Stated differently, the roller wheels 112, 122 of the indicator gauges may be positioned to contact opposite sides of a curved face of the cylindrical object 102. An exemplary indicator gauge 110, 120 may include a Mitutoyo ID-S indicator gauge, although other gauges or sensors may be used which directly contact the cylinder 102 with a rolling contact tip or reflected light beam. The diametrically opposed indicator gauges 110, 120 or other sensors may be aligned axially (in some embodiments to within 0.2 degree accuracy) and configured to send data to a computer 104 via a multiplexer 106. The multiplexer 106 and/or cables may facilitate conversion from one connection interface to another (e.g., serial to universal serial bus). An exemplary multiplexer 106 may include a Mitutoyo MUX 10 multiplexer, although other (e.g., faster) multiplexers are also within the scope of this disclosure. In some embodiments, a connection with a computer 104 is established using an interface other than a multiplexer 106. Gauge reference positions may be zeroed with respect to a calibration bar of known diameter and thermal expansion characteristics.

The two digital indicator gauges 110, 120 may work in tandem to perform diameter measurements of a cylinder 102 as it is slowly rotated over two cylinder rollers 132, 134. In other words, while the cylinder rollers 132, 134 rotate the cylindrical object 102 about its longitudinal axis, the indicator gauges 110, 120 may be used to obtain one or more measurements (e.g., diameter measurements) of the cylinder 102. This setup permits uninterrupted measurement of the outside diameter of the cylinder 102 as the cylinder 102 is slowly rotated. In the embodiment depicted in FIG. 1, the gauges 110, 120 are diametrically opposed and axially aligned. This arrangement of components allows measurement compensation for minor shifts in the cylinder's 102 elevation during measurement, such as might occur because of minor variations in the effective diametral shape of the cylinder rollers 132, 134. This arrangement of economical components produces surprisingly robust, accurate, and convenient measurements.

The arrangement of two digital indicator gauges 110, 120, each fitted with a roller wheel 112, 122, aligned in opposition to each other and working in tandem may record the outside diameter of a cylinder 102 at a user-specified sample rate through one or more 360 degree rotations. This may be done for both the general case involving any cylinder 102, as well as the special case involving rock cores. In some embodiments, the diametral measurement system 100 is designed to measure cylindrical objects from 2 inches to 3.5 inches in diameter and up to 16" in length. However, one of ordinary skill in the art with the benefit of this disclosure will understand that other diameters or lengths may be used in different embodiments for rock cores or other cylinders.

The system 100 of FIG. 1 can enable direct-contact, non-theoretical diametral measurements that are uninterrupted, self-compensated, and sufficiently accurate for their purpose. For example, in some embodiments, the system 100 is configured to measure diametral variation of between 0.5 inches and 0.00005 inches. More particularly, in some embodiments, the system 100 is configured to measure diametral variation of less than 0.1, 0.01, 0.005, 0.001, 0.0005, and/or 0.0001 of an inch. The system 100 may also be configured to obtain real-time measurements of a cylindrical object 102 while continuously rotating the cylindrical object. In some embodiments, the system may be configured to provide a non-theoretical, 360-degree diametral deformation profile of a cylindrical object 102. Other embodiments may incorporate additional design modifications, such as modifications to improve reliability and accuracy.

Methods for obtaining one or more diametral measurements for a cylindrical object are disclosed herein. For example, in some embodiments, a method for obtaining one or more diametral measurements includes one or more of the following steps: (1) obtaining a cylindrical object, such as a cylindrical rock core, (2) rotating the cylindrical object about its longitudinal axis, (3) contacting a curved face of the cylindrical object with a first roller wheel while the cylindrical object is being rotated, (4) contacting the curved surface of the cylindrical object with a second roller wheel such that the second roller wheel is disposed opposite of the first roller wheel while the cylindrical object is being rotated, and (4) obtaining data representative of diametral variation of the cylindrical object based on the displacements of the first roller wheel and the second roller wheel as the cylindrical object is rotated. In some methods, rotating the cylindrical object about its longitudinal axis may include rotating the cylindrical object through at least one full 360 degree rotation. Some methods may include the step of obtaining a non-theoretical 360-degree diametral variation profile of the cylindrical object. In some methods, the cylindrical object is rotated at a constant rate as the cylindrical object is rotated about its longitudinal axis. In some methods, the first roller wheel is a component of a first indicator gauge and the second roller wheel is a component of the second indicator gauge. In some such embodiments, the method may further include sending both (1) a first signal representative of the movement of the first roller wheel from the first indicator gauge to a computer and (2) a second signal representative of movement of the second roller wheel from the second indicator gauge to the computer. In some embodiments, the signals sent from the indicator gauges do not pass through an amplifier.

FIGS. 2-5 depict an embodiment of a diametral measurement system 200 that resembles the diametral measurement system 100 described above in certain respects. Accordingly, like features are designated with like reference numerals, with the leading digits incremented to "2." For example, the embodiment depicted in FIGS. 2-5 includes an indicator gauge 210 that may, in some respects, resemble the indicator gauge 110 of FIG. 1. Relevant disclosure set forth above regarding similarly identified features thus may not be repeated hereafter. Moreover, specific features of diametral measurement systems and related components shown in FIG. 1 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the diametral measurement system 200 and related components depicted in FIGS. 2-5. Any suitable combination of the features, and variations of the same, described with respect to the diametral measurement system 100 and related components illustrated in FIG. 1 can be employed with the diametral measurement system 200 and related components of FIGS. 2-5, and vice versa.

Figure 2:
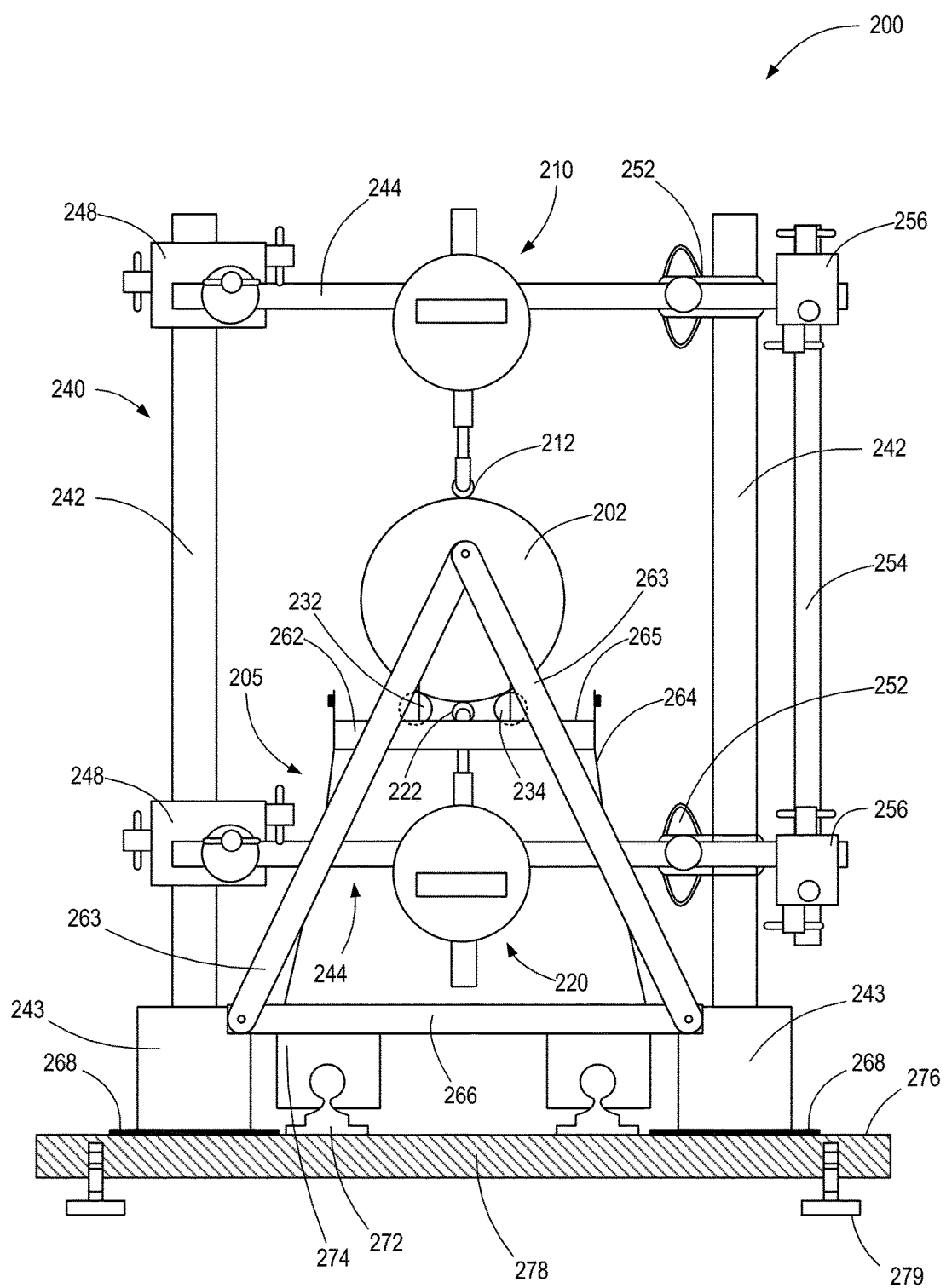
FIG. 2 is a side view of diametral measurement system with a support chassis.
Figure 3:
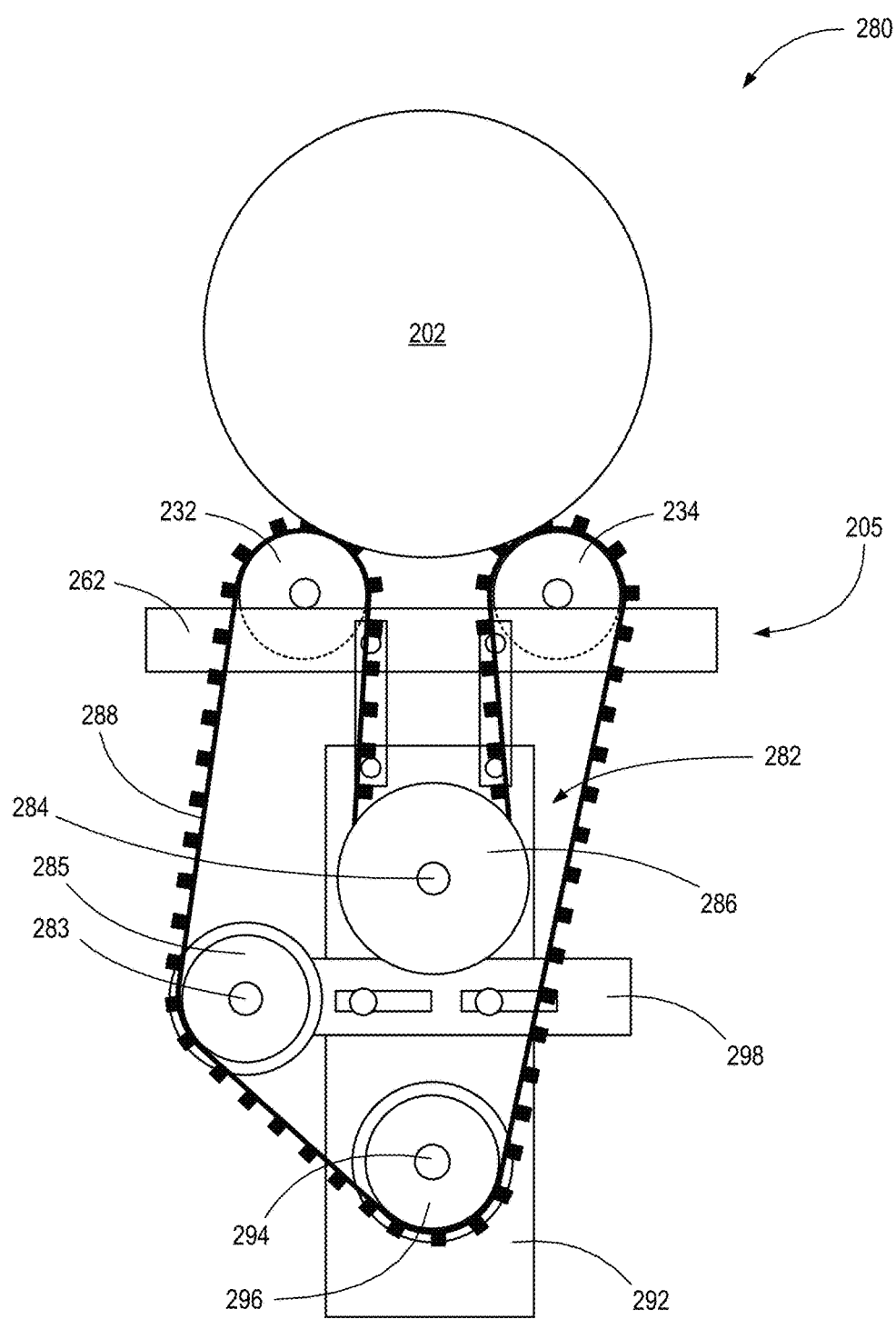
FIG. 3 is a close-up view of a drive assembly for the diametral measurement system of FIG. 2.
Figure 4:
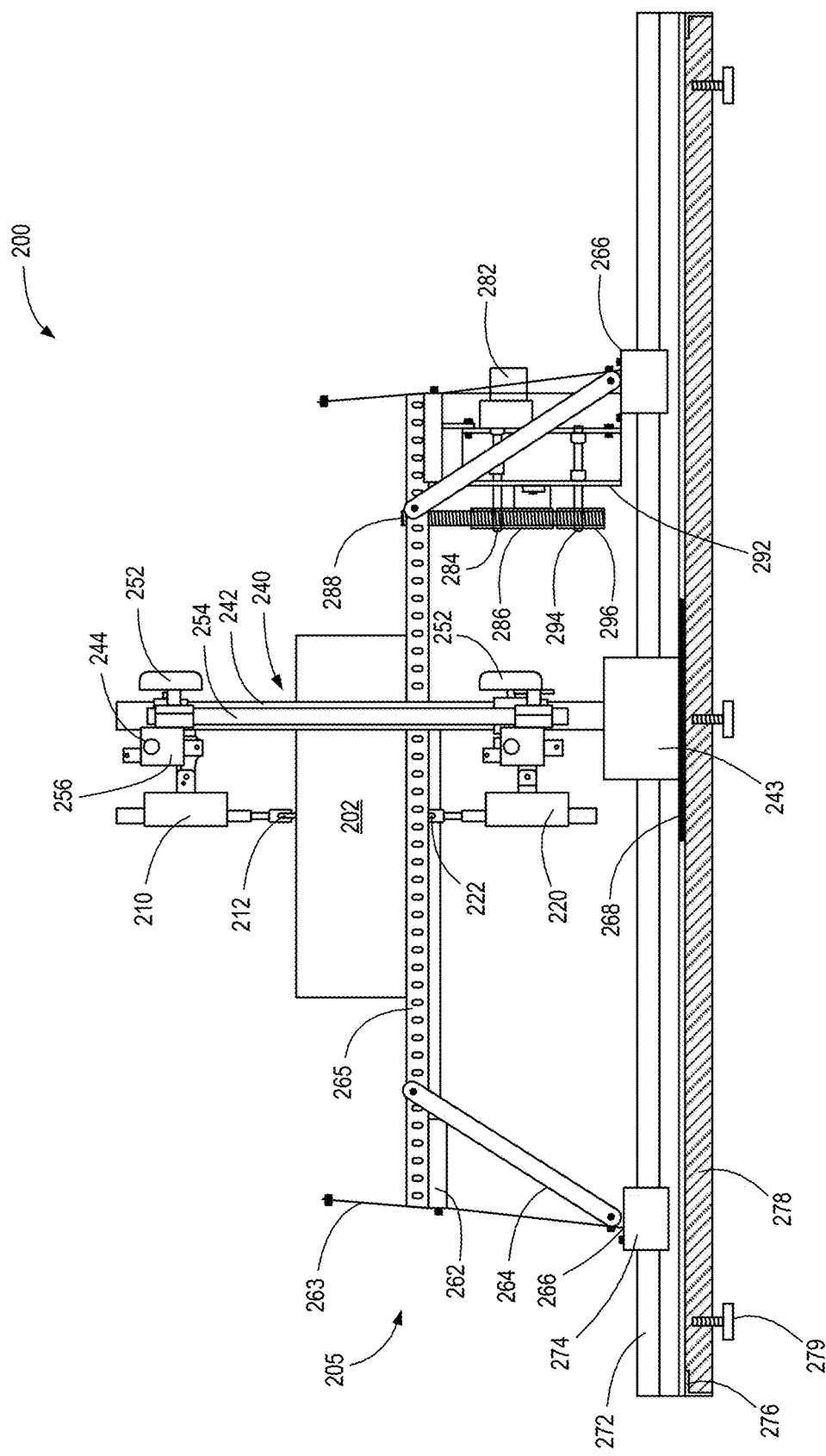
FIG. 4 shows a front view of the diametral measurement system with support chassis of FIG. 2.
Figure 5:
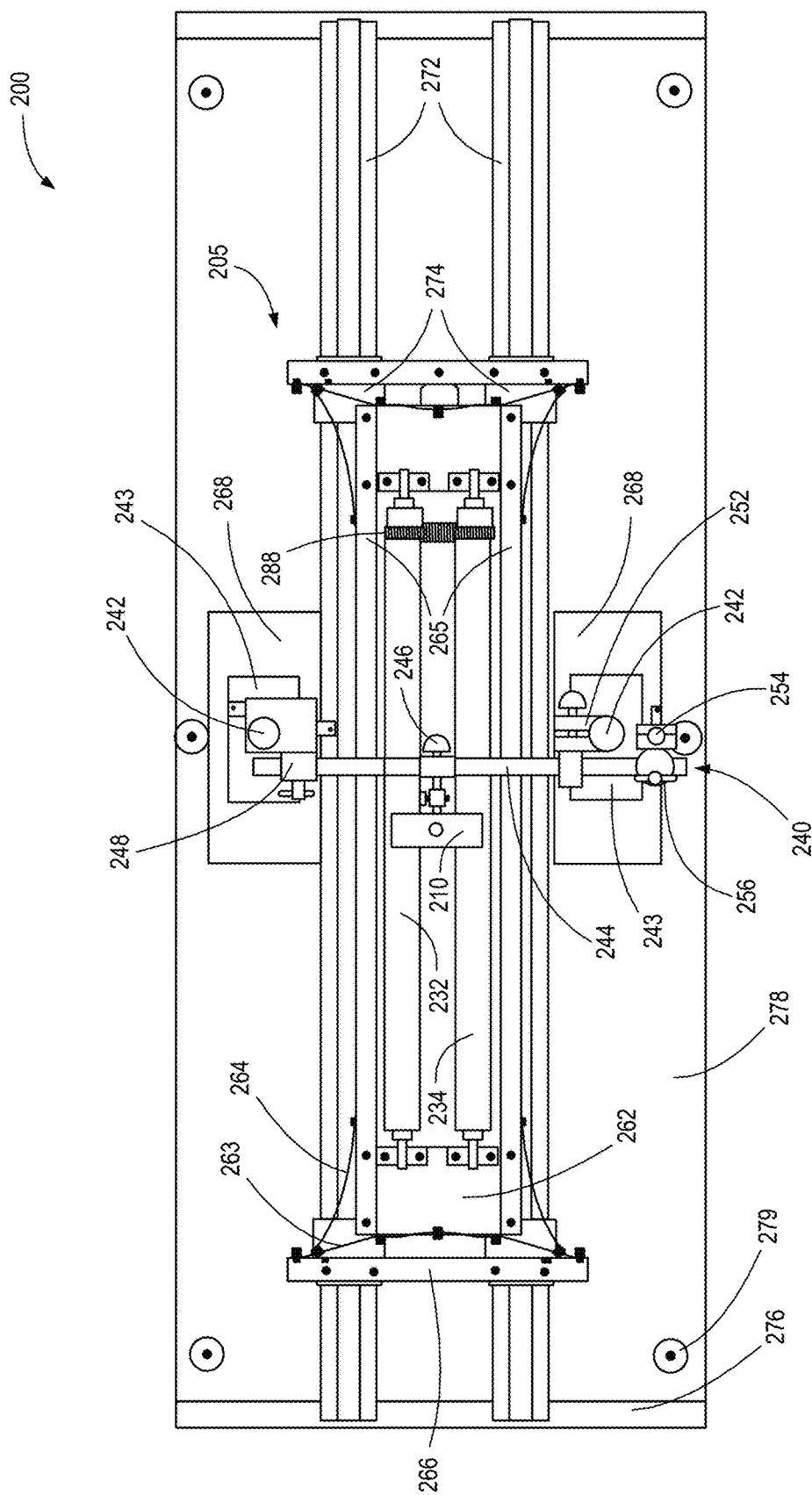
FIG. 5 shows a top view of the diametral measurement system with support chassis of FIG. 2.

FIG. 2 is a side view of a diametral measurement system 200. FIG. 3 is a close-up view of a drive assembly 280 that may be used in connection with the diametral measurement system 200. FIG. 4 provides a front view of the diametral measurement system 200. And FIG. 5 provides a top view of the diametral measurement system 200.

With reference to FIGS. 2-5, the diametral measurement system 200 may include a rigid support chassis 205 and an indicator support frame 240. The support chassis 205 may be configured to support a drive assembly 280 (including a plurality of cylinder rollers 232, 234 for rotating a cylindrical object about its longitudinal axis). The indicator support frame 240 may be configured to support both the first indicator gauge 210 and the second indicator gauge 220 on opposing sides of a cylindrical object 202. The indicator support frame 240 depicted in FIGS. 2-5 combines two king-size magnetic base indicator support columns 242, two indicator support beams 244, two indicator holder clamps 246, two swivel clamps 248, and two cross clamps 252. This combination of existing stock components results in a stable indicator support frame 240 that is economical and facilitates attachment and alignment of the digital indicator gauges 210, 220. The adjustment/reference beam 254 and two swivel clamps 256 are used to facilitate minor adjustments of indicator gauge 210, 220 position without disrupting their axial alignment. The indicator gauges 210, 220 may include roller wheels 212, 222.

An embodiment may integrate lightweight stock steel strips and angles of various lengths into a support chassis 205 which supports the cylinder rollers 232, 234 and drive assembly 280 (see FIG. 3). The support chassis 205 may include two steel base plates 262, a pair of two A-frame side steel strips 263, four frame strut steel strips 264, two horizontal frame steel angles 265, and two steel angle A-frame bases 266. Using individual frame components that are independently adjustable is useful for prototyping purposes. Various alternative configurations and materials for the support chassis 205 and indicator support frame 240 are contemplated.

FIG. 3 is a close-up view of a portion of the diametral measurement system 200 that shows a drive assembly 280 that may be supported by the support chassis 205. In the depicted embodiment, the two parallel rollers (e.g., stationary-axle steel rollers with bearings) used for the cylinder rollers 232, 234 are secured in place atop two steel base plates 262 of the support chassis 205. The cylinder rollers 232, 234 may be configured to cause rotation of the cylindrical object 102 about its longitudinal axis. In some embodiments, the system 200 is configured such that the cylinder rollers 232, 234 do not cause longitudinal movement of the cylindrical object 202 as the cylindrical object 202 is rotated about its longitudinal axis by the cylinder rollers 232, 234. However, in alternative embodiments, the cylindrical object 202 may be longitudinally displaced as it is measured.

The cylinder rollers 232, 234 may be of various sizes. In some embodiments, the cylinder rollers 232, 234 may be turned by a high-torque, low-slow speed (e.g., 3 RPM) gear motor 282 and may be regulated by a variable speed controller.

For example, as shown in the depicted embodiment, the motor 282 may be attached to the outside of an aluminum C-channel housing 292 which also holds and positions various other bearing shafts. The motor 282 may be reversible and configured to operate at a uniform speed that may be selected by the user. The motor's shaft may be coupled to a drive shaft 284 that includes a pinion wheel drive pulley 286 for turning a drive belt 288. The drive assembly 280 may further include an idler shaft 294 that holds an idler pulley 296. A belt tension adjustment 298 contains an idler shaft 283, which holds a belt tension idler pulley 285. The drive belt 288 may have teeth or ribs that mesh with the pinion wheel drive pulley 286. The reverse side of the drive belt 288 (smooth side) may wrap around idler pulley 285, idler pulley 296 and both cylinder rollers 232, 234. Proper tension provides positive, synchronous traction and rotation of the cylinder rollers 232, 234. This provides an economical, durable, and easily maintained drive mechanism that turns the cylinder rollers 232, 234 in sync at a constant rotation speed.

The cylinder rollers 232, 234 may be positioned parallel to and level with each other. The cylinder rollers 232, 234 may also be adjustable and spaced from one another at a distance appropriate for the diameter of the cylinder 202 being tested. The in-line distance between tips of the indicator gauges 210, 220 may be adjusted according to the diameter of the cylinder 202 via repositioning of the upper and/or lower indicator support beams 244 along support columns 242.

Some embodiments of the diametral measurement system 200 may have two linear rails 272, each equipped with two sliding bearing blocks 274 that contact the support chassis 205, thereby improving both support chassis 205 stability and accurate positioning of the cylindrical test subject 202 relative to the indicator gauges 210, 220. The bearing blocks 274 may contain small ball bearings and fit precisely over the linear rails 272 for smooth sliding and secure fit. The support chassis 205 attaches to the blocks at a steel angle A-frame base 266, which allows for adjustment of the support chassis 205 relative to the position of the indicator gauges 210, 220, such as centering the indicator gauges 210, 220 between the cylinder rollers 232, 234 along the path of lateral travel of the chassis 205 over the linear rail 272. The ends of the linear rail 272 rest on two angle irons 276 recessed into and flush with the top of the base board 278 at each of its two ends. Each linear rail 272 may be secured to the base board 278, and the rail ends may rest atop the angle irons 276, facilitating weight transfer from the linear rail 272 and chassis 205 to them, thereby reducing the potential for stress warping of the base board 278.

Six leveling shoes 279 may be mounted to the underside of the base board 278. The leveling shoes 279 may be adjusted by turning their threaded shafts, which have slots cut on top and protrude through the top of the base board 278 top, to facilitate convenient adjustment, using a small flat screw driver.

A small steel plate 268 may be secured to the top of the base board 278 under each of the two magnetic base mounts 243 for magnetic attachment.

Figure 6A:
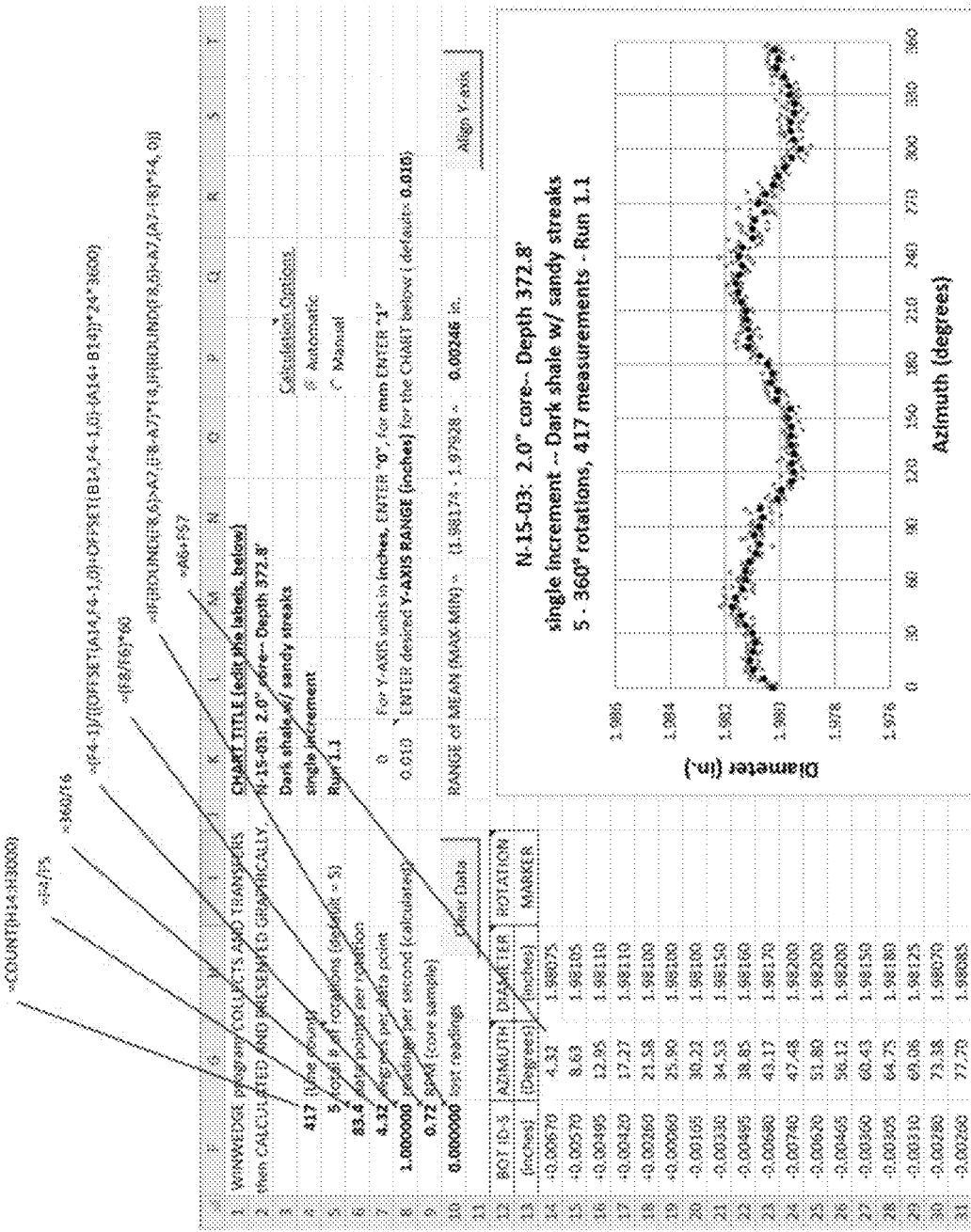
FIG. 6A is an annotated screenshot of a spreadsheet into which data from a diametral measurement system has been entered.
Figure 6B:
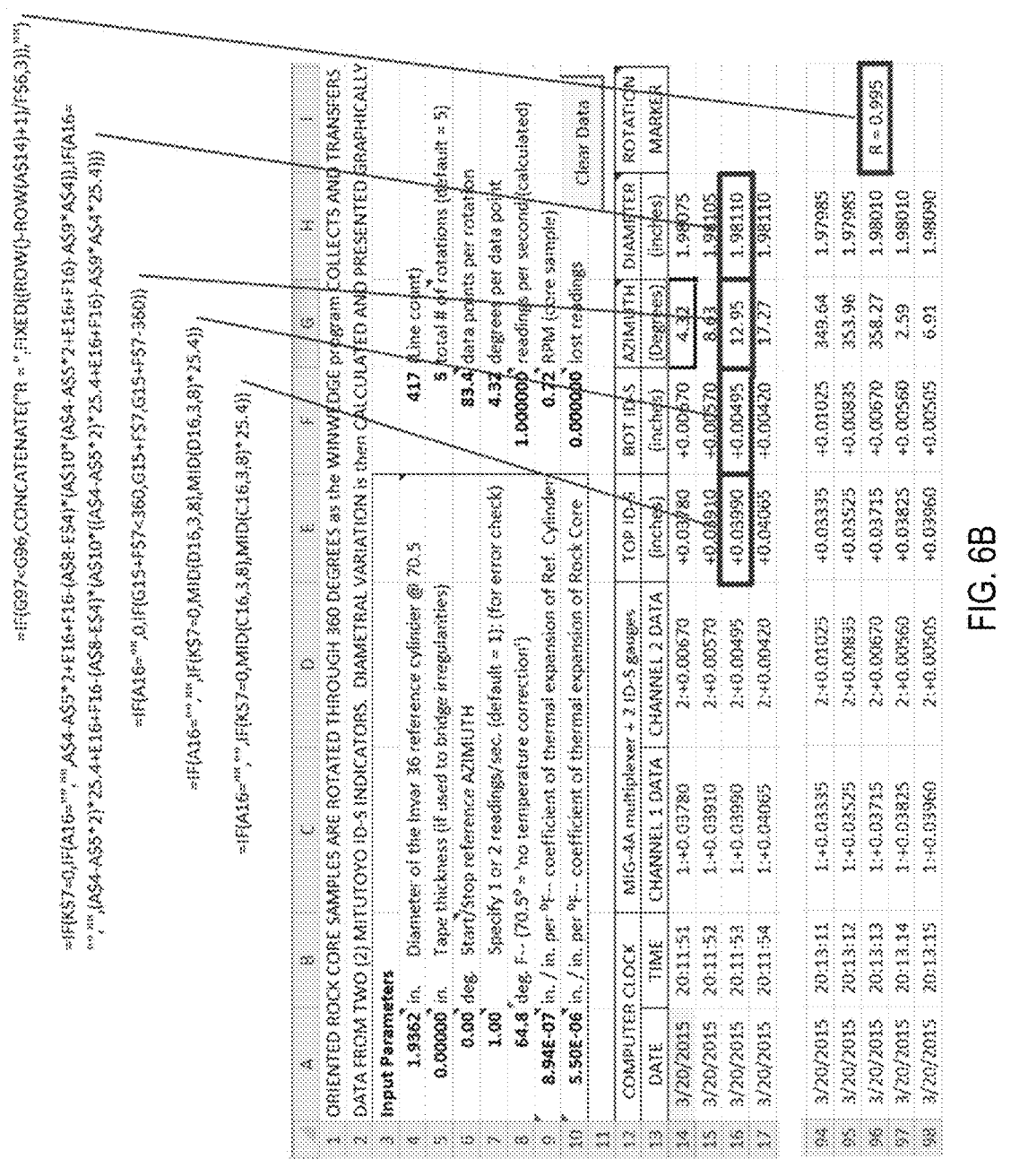

FIGS. 6A and 6B provide annotated screenshots of a spreadsheet application into which data from a diametral measurement system has been input. The data was input as a result of a process that provides the angular position (0-360 degrees) for each measurement of the cylindrical object. In this example, no shaft encoder or similar device was used for inputting the data.

In this example, data received through the multiplexer was transferred in an automated fashion (via Software Wedge v 4.02 Professional) to the proper location within the spreadsheet. The data sample rate was one pair of gauge readings per second, and the computer's clock was used to supply the date and time. The formulas of columns E and F were used to extract gauge position information from the gauge data strings. The formula depicted in column H was used to calculate the diameter at each line of data. The calculations performed in columns G and H were used to assign angular positions to each set of measurements made during five 360-degree rotations of a cylindrical object (i.e., a rock core).

As shown in the example data provided in FIG. 6A, five rotations produced a total of 417 sets of measurements, which corresponds to 83.4 data points per rotation, or one measurement for every 4.32 degrees of rotation (provided that rotation is maintained constant). An example of the code implementation is shown in row 16 of the screenshots provided in FIGS. 6A and 6B. This approach eliminated the need for angular measurement and rotation speed measurement.

In some embodiments, any controlled (e.g., constant) rotation speed may be used. For example, in some embodiments, a diametral profile may be obtained under the following conditions: (1) the measurement session begins and ends at the same reference point location on the cylinder test subject; (2) the cylinder rollers are rotated at a constant rate and have a nearly instantaneous start and stop response; and (3) the number of cylinder rotations is known. Under these conditions, the azimuth may be computed without the need of additional sensors, shaft encoders, or other rotation instrumentation. In other or further embodiments, the arc angle between each diametral measurement is determined by rotation-sensing equipment.

In the example depicted in FIGS. 6A and 6B, a constant rotation speed for the subject test cylinder of 0.72 RPM was used, but other constant speeds may be used in other embodiments. Data recording was initiated one sample interval after cylinder rotation began. Data acquisition was halted after five full cylinder rotations, resulting in the collection of 417 data pairs (cell F4), and the degrees of azimuth between successive data pairs was calculated by first dividing this value (cell F4) by five rotations (cell F5) to yield 83.4 data pairs per rotation (cell F6). By dividing the number of data pairs per rotation (83.4) into 360, 4.32 degrees was calculated as the angle of an arc separating each diametral measurement. Thus, at the sample rate employed in this example (one pair of readings per second), the first data pair azimuth equals 4.32 degrees (cell G14) and all subsequent data pairs are equal to 4.32 plus the azimuth of their respective prior data pair.

To double-check the spreadsheet, the sample rate was verified using the computation set forth in cell F8, i.e., (line count−1)/(stop time−start time). As the calculated value was equal to the specified sample rate (in this example, one pair of readings per second), there were no "lost readings" (cell F10).

The individual data may then be sorted by azimuth into increments whereby an average (mean) value is calculated for each of the increments. For example, 72 increments of 5 degrees may be used in an embodiment. The mean values (which are referred to herein as working data) may be used in performing subsequent analytical and graphic procedures.

Useful or necessary statistics may be computed from the working data. In one embodiment, this may include (for each 5 degree increment) the following parameters: number of values (n) in each increment, mean, standard deviation, upper statistical limit, lower statistical limit, maximum diameter, and minimum diameter. Other statistical parameters known by those of skill in the art may be computed as well.

A spreadsheet may be segmented into worksheets for other specific tasks including but not limited to data sorting, statistical analysis, and characterization of the diametral elongation by a series of numerical and/or graphic processes, including but not limited to constructing one or more deformation ellipses or strain ellipses from one or more 3-point rosette models, for purposes of evaluating in-situ stress magnitude and direction of rock cores. In other embodiments, a different software platform may be used.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Furthermore, the described features, structures, or characteristics may be combined in any suitable manner in one or more embodiments. In the foregoing description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the disclosure.

The invention claimed is:

1. A system for measuring cylindrical objects, the system comprising:
   a first indicator gauge comprising a first roller wheel, wherein the first roller wheel is positioned to contact a curved face of a cylindrical object;
   a second indicator gauge comprising a second roller wheel, wherein the second roller wheel is positioned to contact the curved face of the cylindrical object such that the second roller wheel is disposed opposite the first roller wheel; and
   a plurality of cylinder rollers that are configured to rotate the cylindrical object about a longitudinal axis of the cylindrical object,
   wherein the first indicator gauge and the second indicator gage measure the curved face of the cylindrical object, and wherein the system is configured to calculate a magnitude and orientation of strain on the cylindrical object based on measurements from the first indicator gauge and the second indicator gauge.

2. The system of claim 1, wherein the system is configured to determine a diameter of the cylindrical object.

3. The system of claim 1, wherein the system is configured to provide a non-theoretical, 360-degree diametral deformation profile of the cylindrical object.

4. The system of claim 1, wherein the first and second roller wheels are configured to contact a rock core.

5. The system of claim 4, wherein the system is further configured to:
   calculate a magnitude and orientation of one or more deformations on the curved face of a cylindrical object, and
   determine, based on the magnitude and orientation of the one or more deformations, a magnitude and orientation of strain and stress on the rock core cylinder when the rock core cylinder was confined within the earth.

6. The system of claim 1, further comprising the cylindrical object, wherein the cylindrical object is a rock core.

7. The system of claim 1, wherein the system has exactly two cylinder rollers for rotating the cylindrical object.

8. The system of claim 1, wherein the system is configured such that the plurality of cylinder rollers do not cause longitudinal movement of the cylindrical object as the cylindrical object is rotated about its longitudinal axis by the plurality of roller wheels.

9. The system of claim 1, further comprising:
   a first idler pulley;
   a second idler pulley; and
   a drive belt meshed with a rotating pinion wheel drive pulley, wherein a flat side of the drive belt wraps around the first idler pulley, the second idler pulley, and each cylinder roller of the plurality of cylinder rollers.

10. The system of claim 1, wherein the system is configured for obtaining real-time measurements of the cylindrical object while continuously rotating the cylindrical object.

11. The system of claim 1, wherein:
    a shaft of the first indicator gauge is configured to extend and retract from a housing of the first indicator gauge to ensure that the first roller wheel remains in contact with the cylindrical object as the cylindrical object is rotated; and
    a shaft of the second indicator gauge is configured to extend and retract from a housing of the second indicator gauge to ensure that the second roller wheel remains in contact with the cylindrical object as the cylindrical object is rotated.

12. The system of claim 1, further comprising a computer, wherein the first and second indicator gauges are configured to send diametral measurement data to the computer.

13. The system of claim 1, further comprising an indicator frame, wherein the indicator frame is configured to support both the first indicator gauge and the second indicator gauge on opposing sides of the cylindrical object.

14. The system of claim 1, further comprising:
    a drive assembly for turning the cylinder rollers; and
    a support chassis for supporting the drive assembly and the cylinder rollers.

15. The system of claim 1, wherein the system is configured to measure diametral variation of less than five thousandths of an inch.

16. A method of obtaining one or more diametral measurements for a cylindrical object, the method comprising:
    obtaining a cylindrical object;
    rotating the cylindrical object about a longitudinal axis of the cylindrical object; and
    contacting a curved face of the cylindrical object with a first roller wheel while the cylindrical object is being rotated;
    contacting the curved face of the cylindrical object with a second roller wheel such that the second roller wheel is disposed opposite of the first roller wheel while the cylindrical object is being rotated;
    obtaining data representative of diametral variation of the cylindrical object based on the movement of the first roller wheel and the second roller wheel operating in tandem as the cylindrical object is being rotated; and
    calculating a magnitude and orientation of strain and stress on the cylindrical object based on the data representative of diametral variation.

17. The method of claim 16, wherein rotating the cylindrical object about the longitudinal axis of the cylindrical object comprises rotating the cylindrical object through at least one full 360 degree rotation.

18. The method of claim 17, further comprising obtaining a non-theoretical, 360-degree diametral deformation profile of the cylindrical object.

19. The method of claim 16, wherein the cylindrical object is rotated at a constant rate as the cylindrical object is rotated about its longitudinal axis.

20. The method of claim 16, wherein the first roller wheel is a component of a first indicator gauge and the second roller wheel is a component of a second indicator gauge.

21. The method of claim 20, further comprising:
    sending a first signal representative of movement of the first roller wheel from the first indicator gauge to a computer; and
    sending a second signal representative of movement of the second roller wheel from the second indicator gauge to the computer;
    wherein the signal sent from the first indicator gauge and the signal sent from the second indicator gauge do not pass through an amplifier.

* * * * *